(12) United States Patent
Yamagishi et al.

(10) Patent No.: US 8,966,533 B2
(45) Date of Patent: Feb. 24, 2015

(54) RECEIVING APPARATUS, INFORMATION PROCESSING METHOD, PROGRAM, TRANSMITTING APPARATUS, AND APPLICATION INTERLOCKING SYSTEM FOR ACQUIRING AND EXECUTING AN APPLICATION IN CONJUNCTION WITH REPRODUCTION OF CONTENT

(71) Applicant: Sony Corporation, Tokyo (JP)

(72) Inventors: Yasuaki Yamagishi, Kanagawa (JP); Hitoshi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/938,689

(22) Filed: Jul. 10, 2013

(65) Prior Publication Data

US 2014/0020006 A1   Jan. 16, 2014

Related U.S. Application Data

(60) Provisional application No. 61/670,882, filed on Jul. 12, 2012.

(51) Int. Cl.
*H04N 5/445* (2011.01)
*H04N 7/16* (2011.01)
(Continued)

(52) U.S. Cl.
CPC ....... *H04N 21/8173* (2013.01); *H04N 21/8166* (2013.01); *H04N 21/44008* (2013.01);
(Continued)

(58) Field of Classification Search
CPC .......... H04N 21/8173; H04N 21/8166; H04N 21/44008; H04N 21/4722; H04N 21/4622; H04N 21/4755; H04N 21/4828; G06F 17/30424; G06F 17/30554
USPC ................. 725/19, 46, 53, 61, 132, 136, 140; 707/721, 732, 751
See application file for complete search history.

(56) References Cited

U.S. PATENT DOCUMENTS 8,458,749 B2 * 6/2013 Howcroft et al. ............... 725/61
8,627,380 B2 * 1/2014 Howcroft et al. ............... 725/61
(Continued)

FOREIGN PATENT DOCUMENTS

JP   2002-209204 A   7/2002

OTHER PUBLICATIONS

U.S. Appl. No. 13/934,924, filed Jul. 3, 2013, Yamagishi.
(Continued)

*Primary Examiner* — Hoang-Vu A Nguyen-Ba
(74) *Attorney, Agent, or Firm* — Oblon, Spivak, McClelland, Maier & Neustadt, L.L.P.

(57) ABSTRACT

Disclosed herein is a receiving apparatus including: an extracting part configured to extract signature data representing a feature of reproduced content from the content; a profile generating part configured to generate user profile data; a query generating part configured to generate a query containing the signature data and the user profile data, transmit the query thus generated to a transmitting apparatus, and receive a response that is sent back from the transmitting apparatus in accordance with the query and that has been caused to match with the user profile data in the transmitting apparatus; and an application executing part configured to acquire and execute an application in conjunction with reproduction of the content based on the response thus received.

10 Claims, 5 Drawing Sheets

(51) Int. Cl.
  *G06F 17/30* (2006.01)
  *H04N 21/81* (2011.01)
  *H04N 21/44* (2011.01)
  *H04N 21/4722* (2011.01)
  *H04N 21/462* (2011.01)
  *H04N 21/475* (2011.01)
  *H04N 21/482* (2011.01)
  *H04N 7/173* (2011.01)

(52) U.S. Cl.
  CPC ....... *H04N21/4722* (2013.01); *H04N 21/4622* (2013.01); *H04N 21/4755* (2013.01); *H04N 21/4828* (2013.01); *G06F 17/30424* (2013.01); *G06F 17/30554* (2013.01)
  USPC .................. 725/46; 725/19; 725/53; 725/61; 725/132; 725/136; 725/140; 707/721; 707/732; 707/751

(56) References Cited

U.S. PATENT DOCUMENTS

| | | |
|---|---|---|
| 8,667,542 B1 * | 3/2014 | Bertz et al. ................ 725/62 |
| 2003/0051252 A1 | 3/2003 | Miyaoku et al. |
| 2008/0112690 A1 * | 5/2008 | Shahraray et al. ............ 386/124 |
| 2013/0103716 A1 | 4/2013 | Yamagishi |
| 2013/0145414 A1 | 6/2013 | Yamagishi |

OTHER PUBLICATIONS

U.S. Appl. No. 13/937,684, filed Jul. 9, 2013, Yamagishi.
International Search Report issued Oct. 15, 2013, in PCT/JP2013/068147 with English translation of category of cited documents.

* cited by examiner

FIG.4

| | |
|---|---|
| 61 | ACR QUERY IDENTIFIER |
| 62 | EXTRACTION SYSTEM IDENTIFIER |
| 63 | SERVICE IDENTIFIER |
| 64 | SIGNATURE DATA |
| 65 | LOCAL TIME STAMP |
| 66 | USER PROFILE DATA |
| 67 | TRANSMISSION SOURCE ADDRESS |
| 68 | SIGNATURE |

| | |
|---|---|
| 71 | ACR QUERY IDENTIFIER |
| 72 | EXTRACTION SYSTEM IDENTIFIER |
| 73 | SERVICE IDENTIFIER |
| 74 | CONTENT IDENTIFIER |
| 75 | REPRODUCTION TIME |
| 76 | LOCAL TIME STAMP |
| 77 | ASSOCIATED METADATA |
| 78 | TRANSMISSION SOURCE ADDRESS |
| 79 | SIGNATURE |

| | |
|---|---|
| 71 | ACR QUERY IDENTIFIER |
| 73 | SERVICE IDENTIFIER |
| 80 | IDENTIFICATION FAILING FLAG |
| 78 | TRANSMISSION SOURCE ADDRESS |
| 79 | SIGNATURE |

70

RECEIVING APPARATUS, INFORMATION PROCESSING METHOD, PROGRAM, TRANSMITTING APPARATUS, AND APPLICATION INTERLOCKING SYSTEM FOR ACQUIRING AND EXECUTING AN APPLICATION IN CONJUNCTION WITH REPRODUCTION OF CONTENT

CROSS-REFERENCE TO RELATED APPLICATION

This application claims the benefit of priority of Provisional Application Ser. No. 61/670,882, filed Jul. 12, 2012, the entire contents of which is incorporated herein by reference.

BACKGROUND

The present disclosure relates to a receiving apparatus, an information processing method, a program, a transmitting apparatus, and an application interlocking system, and more particularly to a receiving apparatus, an information processing method, a program, a transmitting apparatus, and an application interlocking system which are suitable for being used in a case where an application program is run in conjunction with reproduction of content such as a television program.

For example, let us consider a case where, for a viewer of a TV (television) program, information (performers, an outline, a trailer, and the like) associated with a TV program being broadcasted (hereinafter simply referred to as a program), information (news, weather forecast, traffic information, and the like) which is not directly related to the program but is useful for the viewer, and the like are displayed on a screen.

In order to realize this, it is only necessary that a command to acquire and run a dedicated application program (hereinafter abbreviated to an application) is transmitted to a TV receiving set or the like in conjunction with the proceeding of the program. Actually, in Japan, Europe, and the like, it has already been realized by transmitting the command concerned and the application by utilizing a band for a data broadcasting in a TV broadcasting signal (for example, refer to Japanese Patent Laid-Open No. 2006-50237).

On the other hand, in the US, since the band for the data broadcasting is not provided in the TV broadcasting signal and an alternative method is not yet established, it is not yet realized that the application is carried out in conjunction with the proceeding of the program.

It is to be noted that in the US, the number of family units each of which views a program through a CATV (Cable Television), an IPTV (Internet Protocol Television) or the like is larger than the number of family units each of which directly receives a TV broadcasting wave with a TV receiving set to view a program. Since in the CATV or the IPTV, only a video signal and an audio signal of a program are extracted from a TV broadcasting signal to be delivered in some cases, even if the band for the data broadcasting is provided in the TV broadcasting signal in the US, there is no guarantee that the data broadcasting signal, including data on the application is transmitted up to a receiving apparatus.

In addition thereto, recently, not only in a case where a program being broadcasted is viewed, but also in a case where arbitrary content such as a program which is recorded to be reproduced, a video data a signal of which is read out from a package media such as a DVD (Digital Versatile Disk) or a BD (Blu-ray Disc), or a moving picture a signal of which is downloaded from the Internet are viewed, there is a request that an application is desired to be executed in conjunction with such arbitrary content.

SUMMARY

However, it is, of course, not yet realized that an application is executed in conjunction with arbitrary content.

In addition thereto, although it is desired that not only an application is simply executed in conjunction with the content, but also an application suitable for a user who views the content is executed or information suitable for the user is presented in the application which has been executed, a method fulfilling the desire has not yet been established.

The present disclosure has been made in the light of such circumstances, and it is therefore desirable to enable an application suitable for a user to be executed in conjunction with proceeding of arbitrary content being viewed.

A receiving apparatus as a first embodiment of the present disclosure includes: an extracting part configured to extract signature data representing a feature of reproduced content from the content; a profile generating part configured to generate user profile data; a query generating part configured to generate a query containing the signature data and the user profile data, transmit the query thus generated to a transmitting apparatus, and receive a response that is sent back from the transmitting apparatus in accordance with the query and that has been caused to match with the user profile data in the transmitting apparatus; and an application executing part configured to acquire and execute an application in conjunction with reproduction of the content based on the response thus received.

An information processing method of a receiving apparatus as the first embodiment of the present disclosure, the method executed by the receiving apparatus, includes: extracting signature data representing a feature of reproduced content from the content; generating user profile data; generating a query containing the signature data and the user profile data, and transmitting the query thus generated to a transmitting apparatus, and receiving a response that is sent back from the transmitting apparatus in accordance with the query and that has been caused to match with the user profile data in the transmitting apparatus; and acquiring and executing an application in conjunction with reproduction of the content based on the response thus received.

A program as the first embodiment of the present disclosure causes a computer to function as: an extracting part configured to extract signature data representing a feature of reproduced content from the content; a profile generating part configured to generate user profile data; a query generating part configured to generate a query containing the signature data and the user profile data, transmit the query thus generated to a transmitting apparatus, and receive a response that is sent back from the transmitting apparatus in accordance with the query and that has been caused to match with the user profile data in the transmitting apparatus; and an application executing part configured to acquire and execute an application in conjunction with reproduction of the content based on the response thus received.

In the first embodiment of the present disclosure, the signature data representing the feature of the reproduced content is extracted from the reproduced content, the user profile data is generated. The query containing the signature data and the user profile data is generated and is then transmitted to the transmitting apparatus. The response that is sent back from the transmitting apparatus in response to the query and that has been caused to match with the user profile data in the transmitting apparatus is received. Also, the application is acquired and executed in conjunction with the reproduction of the content based on the response thus received.

A transmitting apparatus as a second embodiment of the present disclosure includes: a database showing a correspondence relationship among signature data representing a feature of content extracted from the content, a content identifier representing the content of an extraction source, and associated metadata containing an application identifier representing an application caused to be executed in conjunction with the content; a response generating part configured to identify the content of the extraction source of the signature data contained in a query transmitted from a receiving apparatus by referring to the database, generate a response containing the associated metadata including the application identifier representing the application caused to be executed in conjunction with the content thus identified, and send the response back to the receiving apparatus; and a matching part configured to cause the associated metadata contained in the response before the sending-back to match with the user profile data contained in the query.

In the second embodiment of the present disclosure, by referring to the database showing the correspondence relationship among the signature data representing the feature of the content extracted from the content, the content identifier representing the content of the extraction source, and the associated metadata containing the application identifier representing the application caused to be executed in conjunction with the content, the content of the extraction source of the signature data contained in the query transmitted from the receiving apparatus is identified. Also, the response containing the associated metadata including the application identifier representing the application caused to be executed in conjunction with the content thus identified is generated and is then sent back to the receiving apparatus. It is to be noted that the associated metadata contained in the response before the sending-back is caused to match with the user profile data contained in the query.

An application interlocking system as a third embodiment of the present disclosure includes a transmitting apparatus and a receiving apparatus of content. The receiving apparatus includes: an extracting part configured to extract signature data representing a feature of reproduced content from the content; a profile generating part configured to generate user profile data; a query generating part configured to generate a query containing the signature data and the user profile data, transmit the query thus generated to the transmitting apparatus, and receive a response that is sent back from the transmitting apparatus in accordance with the query and that has been caused to match with the user profile data in the transmitting apparatus; and an application executing part configured to acquire and execute an application in conjunction with reproduction of the content based on the response thus received. The transmitting apparatus includes: a database showing a correspondence relationship among the signature data representing the feature of the content extracted from the content, a content identifier representing the content of an extraction source, and associated metadata containing an application identifier representing the application caused to be executed in conjunction with the content; a response generating part configured to identify the content of the extraction source of the signature data contained in the query transmitted from the receiving apparatus by referring to the database, generate the response containing the associated metadata including the application identifier representing the application caused to be executed in conjunction with the content thus identified, and send the response back to the receiving apparatus; and a matching part configured to cause the associated metadata contained in the response before the sending-back to match with the user profile data contained in the query.

In the third embodiment of the present disclosure, by the receiving apparatus, the signature data representing the feature of the content reproduced is extracted from the reproduced content, the query containing the signature data and the user profile data is generated and is then transmitted to the transmitting apparatus. The response that is sent back from the transmitting apparatus in response to the query and that has been caused to match with the user profile data in the transmitting apparatus is received, and the application is acquired and executed in conjunction with the reproduction of the content based on the response thus received. On the other hand, by the transmitting apparatus, by referring to the database showing the correspondence relationship among the signature data representing the feature of the content extracted from the content, the content identifier representing the content of the extraction source, and the associated metadata containing the application identifier representing the application caused to be executed in conjunction with the content, the content of the extraction source of the signature data contained in the query transmitted from the receiving apparatus is identified. Also, the response containing the associated metadata including the application identifier representing the application caused to be executed in conjunction with the content thus identified is generated and is then sent back to the receiving apparatus. It is to be noted that the associated metadata contained in the response before the sending-back is caused to match with the user profile data contained in the query.

According to the first embodiment of the present disclosure, the application suitable for the user can be executed in conjunction with the proceeding of the content being viewed.

According to the second embodiment of the present disclosure, the content being viewed can be identified in the receiving apparatus, and the application suitable for the user can be supplied in conjunction with the proceeding.

According to the third embodiment of the present disclosure, the content being viewed can be identified in the receiving apparatus, and the application suitable for the user can be supplied from a transmitting apparatus to the receiving apparatus in conjunction with the proceeding.

BRIEF DESCRIPTION OF THE DRAWINGS

FIG. 4 is a diagram showing a data structure of an ACR query;

FIGS. 5A and 5B are diagrams showing data structures of an ACR response;

DETAILED DESCRIPTION OF THE PREFERRED EMBODIMENT

Hereinafter, the best mode for carrying out the present disclosure (hereinafter referred to as an embodiment) will be described in detail with reference to the accompanying drawings.

[Example of Configuration of Application Interlocking System]

Figure 1:
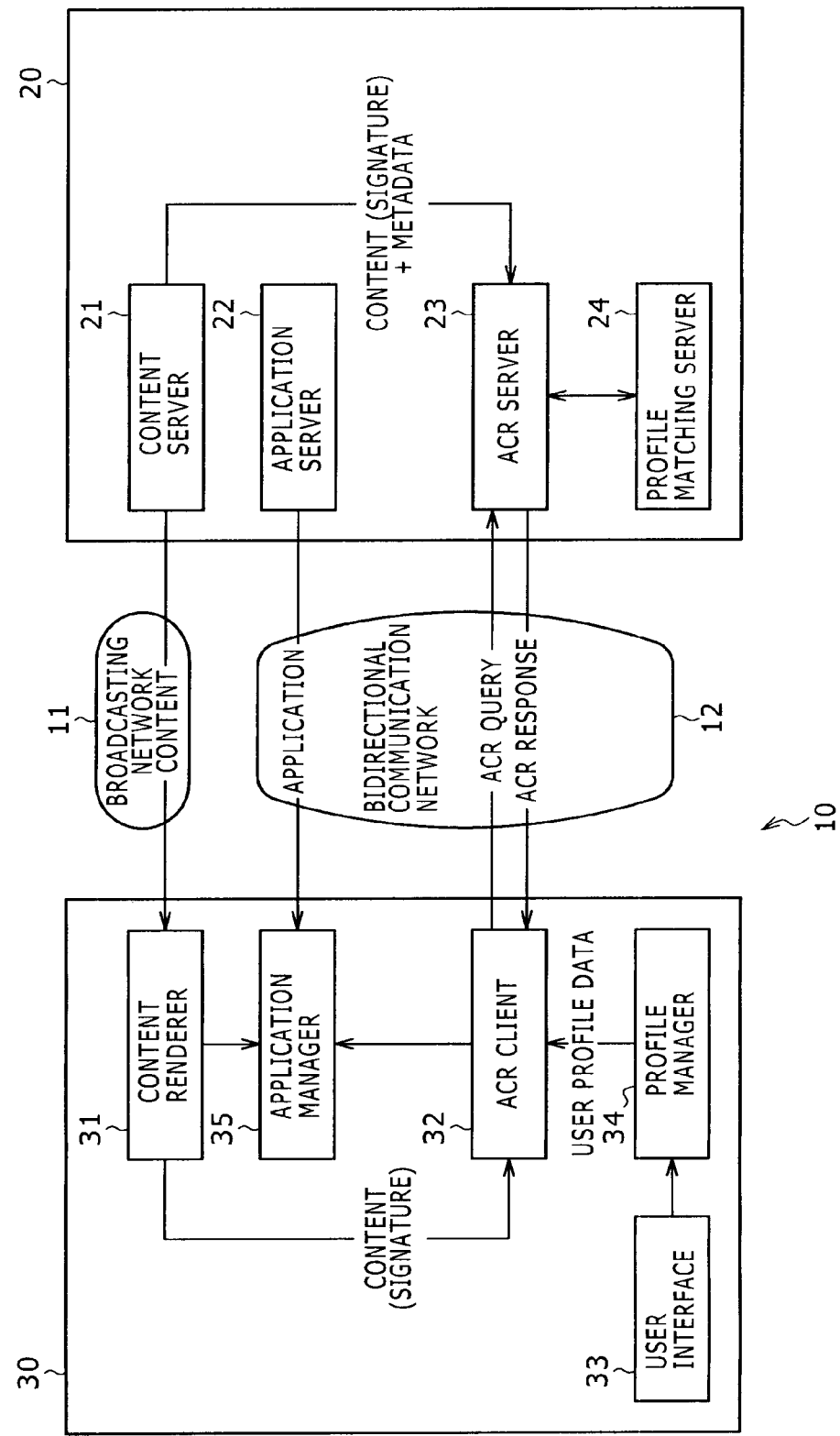
FIG. 1 is a block diagram showing an example of a configuration of an application interlocking system as an embodiment of the present disclosure.

FIG. 1 is a block diagram showing an example of a configuration of an application interlocking system as an embodiment of the present disclosure.

This application interlocking system 10 identifies content which a user is viewing with a screen of a TV receiving set or the like as a monitor, and causes an application suitable for the user to be executed in conjunction with the proceeding of the content concerned, and presents information suitable for the user through the application being executed.

Here, the content is by no means limited to a program which has been received by the TV receiving set and which is being broadcasted. For example, all AV (Audio Visual) content such as a program which is recorded and reproduced by a video recorder, a video such as a motion picture which is reproduced from a package media by a multi-media player, and a moving picture which is downloaded through the Internet is contained in the content. In addition, a commercial message (hereinafter referred to as a CM) which, for example, is inserted between programs or during a program is also contained in the content.

For the identification of the content, ACR for comparing signature data (feature quantity) which is periodically extracted from content being viewed and signature data of content which is previously registered in a database with each other, thereby identifying the content, is used.

The application interlocking system 10 includes a transmitting apparatus 20 and plural receiving apparatuses 30 which are connected to the transmitting apparatus 20 through a broadcasting network 11 and a bidirectional communication network 12. The broadcasting network 11 is a TV broadcasting network, a CATV network, an IPTV network, or the like. The bidirectional communication network 12 is an IP communication network represented by the Internet.

Each of the receiving apparatuses 30 shall be disposed in a user's home or the like in a state of being built in a TV receiving set or the like.

[Description of Transmitting Apparatus 20]

The transmitting apparatus 20 includes a content server 21, an application server 22, an ACR server 23, and a profile matching server 24.

The content server 21 broadcasts content such as a program and a CM through the broadcasting network 11. In addition, the content server 21 supplies the broadcasted content and metadata corresponding to the content to the ACR server 23. An identifier representing an application which is executed in conjunction with the proceeding of the content, an acquisition destination of the identifier concerned, data which is used in the application and the like are contained in the metadata. It is to be noted that the signature data representing the feature of the content may be supplied to the ACR server 23 instead of supplying the content.

The application server 22 supplies an application or data to be utilized in the application concerned through the bidirectional communication network 12 on request from the receiving apparatus 30.

The ACR server 23 previously makes a database of ACR reference data with which a content identifier, an application identifier and the like are caused to correspond to the signature data extracted with a predetermined sampling period from each of the various kinds of content which can be viewed on the receiving apparatus 30 side, and holds the ACR reference data in the database. The ACR server 23 generates and sends back an ACR response in response to an ACR query transmitted thereto from the receiving apparatus 30 based on the database of the ACR reference data.

When the ACR response corresponding to the ACR query is generated in the ACR server 23, the profile matching server 24 carries out matching and filtering for associated metadata stored in the ACR response based on user profile data of the receiving apparatus 30 contained in the ACR query.

The content server 21, the application server 22, the ACR server 23, and the profile matching server 24 included in the transmitting apparatus 20 either may be disposed so as to be concentrated on one portion, or may be disposed so as to be distributed. In addition, the content server 21, the application server 22, the ACR server 23, and the profile matching server 24 may also be configured so as to be suitably combined with one another. In addition thereto, plural ACR servers 23 and plural profile matching servers 24 may exist.

[Description of Receiving Apparatus 30]

The receiving apparatus 30 has a content renderer 31, an ACR client 32, a user interface 33, a profile manager 34, and an application manager 35.

The content renderer 31 acquires and branches all of the content displayed on a display device of the TV receiving set or the like in which the receiving apparatus 30 is built, thereby supplying to the ACR client 32. That is to say, the content renderer 31 acquires and branches not only the content which are broadcasted from the content server 21, but also the content which are inputted through various kinds of input terminals (such as an HDMI (High-Definition Multimedia Interface) terminal) of the TV receiving set, thereby supplying to the ACR client 32.

The ACR client 32 extracts the signature data representing the feature of the content with a predetermined sampling period from the content inputted from the content renderer 31. Here, a same extraction system (which will be described later) as that for the ACR server 23 of the transmitting apparatus 20 shall be used as an extraction system of the signature data.

In addition, the ACR client 32 generates the ACR query containing the extracted signature data and the user profile data, and transmits the ACR query thus generated to the ACR server 23 of the transmitting apparatus 20 through the bidirectional communication network 12. In addition, the ACR client 32 receives and holds the ACR response which has been sent back from the ACR server 23 in response to the transmitted ACR query. In addition thereto, the ACR client 32 analyzes the ACR response held therein, and causes the application manager 35 to execute the application corresponding to the content being viewed in conjunction with the proceeding of the content.

The user interface 33 receives an input operation for the profile data of the user himself/herself, a selection operation for the content to be reproduced, an operation for the executed application, and the like.

The profile manager 34 generates the user profile data based on the information inputted thereto by using the user interface 33, an operation history and the like, and outputs the user profile data thus generated to the ACR client 32.

Items such as a demographic attribute (age, sex, occupation, education background, inhabited area, e-mail address, hobby, preference, language, household size, and viewing tendency of content) of the user, a specification (such as a kind of utilizable CODEC) of the receiving apparatus 30, a congestion situation of the bidirectional communication network 12, and natural environment information (such as weather, temperature and humidity) can be contained in the user profile data generated.

The application manager 35 acquires the application corresponding to the content being viewed from the application server 22 through the bidirectional communication network 12 and executes the application thus acquired in accordance with the control made by the ACR client 32. For the application which is executed in the application manager 35, the associated metadata corresponding to the application being executed is acquired from the ACR client 32 by using an associated metadata acquisition API (Application Program Interface).

[Example of Detailed Configuration of ACR Server 23]

Figure 2:
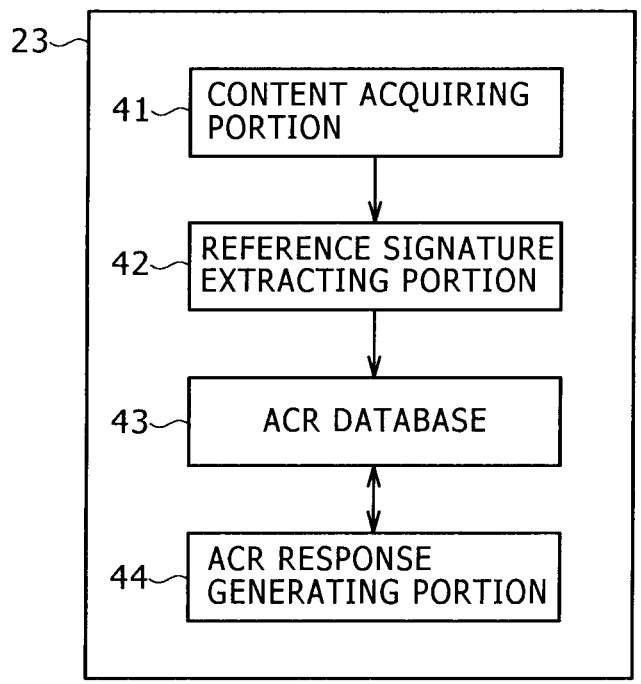
FIG. 2 is a block diagram showing an example of a configuration of an ACR (Automatic Content Recognition) server.

FIG. 2 shows an example of a detailed configuration of the ACR server 23.

The ACR server 23 includes a content acquiring portion 41, a reference signature extracting portion 42, an ACR database 43, and an ACR response generating portion 44.

The content acquiring portion 41 acquires the content which is to be broadcasted through the broadcasting network 11 by the content server 21 and the metadata of the content from the content server 21, and supplies the content thus acquired to the reference signature extracting portion 42. In addition, the content acquiring portion 41 acquires various kinds of content which can be viewed on the receiving apparatus 30 side and the metadata of the content from the outside, and supplies the content thus acquired to the reference signature extracting portion 42.

The reference signature extracting portion 42 extracts the signature data representing the feature of the content supplied thereto from the content acquiring portion 41 from the content concerned with a predetermined sampling period in accordance with a predetermined extraction system, and outputs the signature data thus extracted to the ACR database 43. An existing arbitrary technique can be applied to the system for extracting the signature data. For example, either a watermark which is previously buried in the content may be extracted to be made the signature data, or a fingerprint may be calculated to be made the signature data.

By using the fingerprint as the signature data, even if a resolution of the content, an aspect ratio, a bit rate, a coding format, and the like are converted, the same signature data can be obtained between before and after the conversion. Therefore, it is possible to increase the identification precision when the content is identified based on the signature data concerned.

It is to be noted that, when plural ACR servers 23 exist, the systems for extracting the signature data in the respective reference signature extracting portions 42 are not necessarily unified, and thus an arbitrary extraction system can be adopted every ACR server 23.

The ACR database 43 generates the ACR reference data with which the content identifier or the like representing the content of an extraction source of the signature data inputted thereto from the reference signature extraction portion 42 is made to correspond to the signature data concerned, and stores therein the ACR reference data thus generated. As a result, a database of the signature data extracted from the content is compiled. A data structure of the ACR reference data will be described later with reference to FIG. 3.

The ACR response generating portion 44 identifies the content of the extraction source of the signature data contained in the ACR query which has been transmitted thereto from the ACR client 32 by referring to the ACR database 43. In addition, the ACR response generating portion 44 generates the ACR response containing therein the content identifier as the identification result, the associated metadata, and the like. In addition thereto, the ACR response generating portion 44 carries out matching and filtering for the associated metadata stored in the ACR response in accordance with the control made by the profile matching server 24, and transmits the resulting data to the receiving apparatus 30. A data structure of the ACR response will be described later with reference FIG. 5.

[Data Structure of ACR Reference Data]

Figure 3:
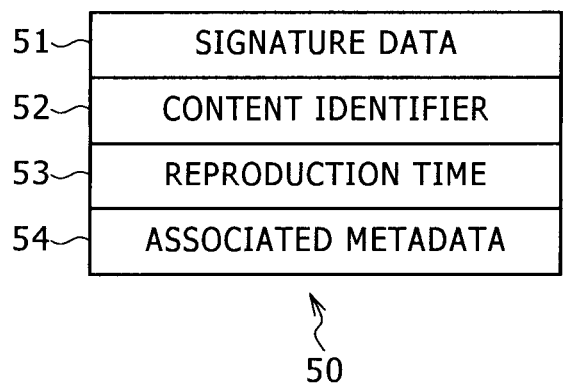
FIG. 3 is a diagram showing a data structure of ACR reference data.

FIG. 3 shows a data structure of the ACR reference data which is compiled as a database in the ACR database 43 of the ACR server 23.

In an ACR reference data 50, a content identifier 52, reproduction time 53, and associated metadata 54 are made to correspond to signature data 51.

The signature data 51 is extracted from the content in the reference signature extracting portion 42. The content identifier 52 is information for identification of the content of the extraction source of the signature data 51 concerned. The reproduction time 53 represents a timing of the proceeding of the content when the signature data 51 concerned is extracted from the content represented by the content identifier 52, and is represented by elapsed time from the head of the content concerned.

The application identifier representing an application to be executed in conjunction with the timing of the proceeding of the content represented by the reproduction time 53 of the content represented by the content identifier 52, information representing the acquisition destination (the application server 22) of the application concerned, and various kinds of data utilized by the application executed are all contained in the associated metadata 54.

It is to be noted that the associated metadata 54 may be different depending on the timing of the proceeding of the content represented by the reproduction time 53.

[Data Structure of ACR Query]

FIG. 4 shows a data structure of the ACR query which is generated in the ACR client 32.

An ACR query identifier 61, an extraction system identifier 62, a service identifier 63, signature data 64, a local time stamp 65, user profile data 66, a transmission source address 67, and a signature 68 are all contained in an ACR query 60.

The ACR query identifier 61 is information for unique identification of the ACR query 60 concerned. The extraction system identifier 62 is information for identification of an extraction system which was used when the signature data 64 was extracted. The service identifier 63 is information for selection of the ACR server 23 configured to transmit the ACR query 60 concerned to obtain the ACR response when plural ACR servers 23 exist.

The signature data 64 is extracted from the content in the ACR client 32. The local time stamp 65 represents a timing at which the signature data 64 is extracted from the content, and is represented by the time which a local system clock of the receiving apparatus 30 indicates.

The user profile data 66 is generated in the profile manager 34. The transmission source address 67 is an address, on the bidirectional communication network 12, of the ACR client 32 which transmits the ACR query 60 concerned, and is utilized as information representing a return destination of the ACR response which is generated in the ACR server 23 in response to the ACR query 60 concerned. The signature 68 suppresses falsification of the ACR query 60 concerned. It is to be noted that the entire ACR query 60 may be encrypted to be transmitted.

[Data Structure of ACR Response]

FIGS. 5A and 5B show data structures of the ACR response which is generated in the ACR response generating portion 44 of the ACR server 23.

It is to be noted that FIG. 5A shows a data structure of the ACR response when it was possible to identify the content of the extraction source of the signature data 64 contained in the ACR query 60, that is, when it was possible to identify the content being viewed in the receiving apparatus 30. FIG. 5B shows a data structure of the ACR response when it was not possible to identify the content.

An ACR query identifier 71, an extraction system identifier 72, a service identifier 73, a content identifier 74, reproduction time 75, a local time stamp 76, associated metadata 77, a transmission source address 78, and a signature 79 are all contained in an ACR response 70 (FIG. 5A) when it was possible to identify the content being viewed in the receiving apparatus 30.

On the other hand, the ACR query identifier 71, the service identifier 73, the transmission source address 78, the signature 79, and an identification failing flag 80 are all contained in the ACR response 70 (FIG. 5B) when it was not possible to identify the content being viewed in the receiving apparatus 30.

The ACR query identifier 71, the extraction system identifier 72, the service identifier 73, and the local time stamp 76 are provided for identifying the ACR query 60 as a trigger with which the ACR response 70 concerned was generated. Thus, the ACR query identifier 61, the extraction system identifier 62, the service identifier 63, and the local time stamp 65 of the corresponding ACR query 60 are all quoted, thereby being described therein.

The content identifier 74, the reproduction time 75, and the associated metadata 77 represent the identification result. The content identifier 52, the reproduction time 53, and the associated metadata 54 of the corresponding ACR reference data 50 are all quoted, thereby being described therein.

The transmission source address 78 is an address, on the bidirectional communication network 12, of the ACR server 23 which transmits the ACR response 70 concerned. The signature 79 suppresses falsification of the ACR response 70 concerned. It is to be noted that the entire ACR response 70 may be encrypted to be transmitted, thereby preventing falsification of the ACR response 70 concerned.

The identification failing flag 80 is a flag representing that it was not possible to identify the content of the extraction source of the signature data 64 contained in the ACR query 60 from the ACR client 32, that is, the content being viewed in the receiving apparatus 30 in the ACR server 23.

[Operation by Application Interlocking System 10]

Next, an operation of the application interlocking system 10 will be described.

Figure 6:
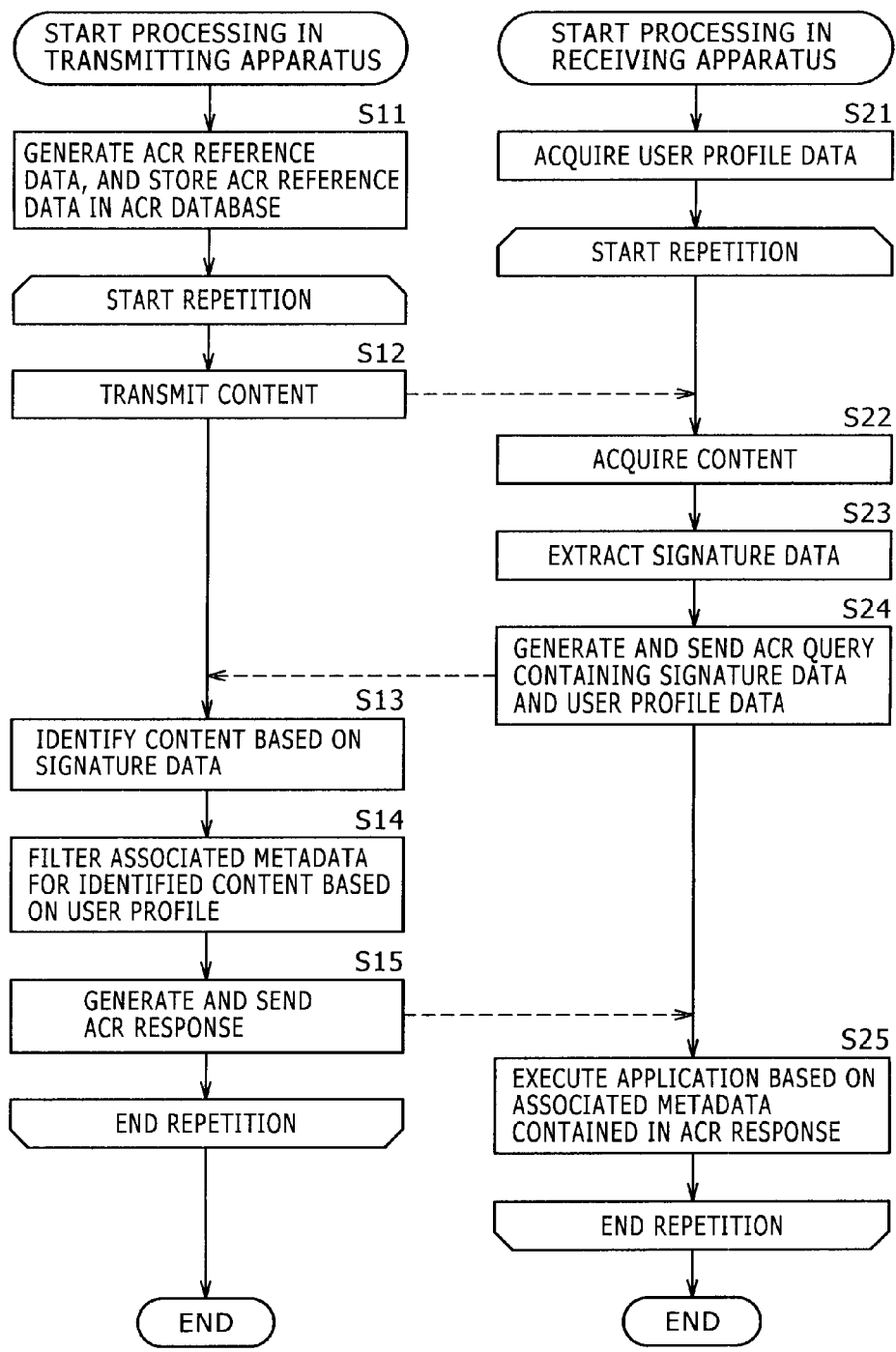
FIG. 6 is a flow chart explaining an operation of the application interlocking system.

FIG. 6 is a flow chart explaining an operation of the application interlocking system 10.

In Step S11, as preprocessing for starting transmission of the content through the broadcasting network 11, the transmitting apparatus 20 supplies the content which are to be started transmitting in and after Step S11 and the associated metadata thereof to the ACR server 23. The ACR server 23 generates the ACR reference data by using the content and associated metadata thereof thus supplied, and registers the ACR reference data thus generated in the ACR database.

After the database of the ACR reference data corresponding to the content to be broadcasted is made in such a way, Steps S12 to S15 which will be subsequently described are repetitively executed.

In Step S12, the transmitting apparatus 20 starts the transmission of the content through the broadcasting network 11.

In the receiving apparatus 30, in Step S21, as preprocessing of reception and reproduction of the content, the profile manager 34 generates the user profile data and supplies the user profile data thus generated to the ACR client 32. It is to be noted that, of the items contained in the user profile data, the items such as the congestion situation of the bidirectional communication network 12 and the natural environment information which are dynamically changed shall be updated in and after Step S21 as well at any time.

In the receiving apparatus 30, while the content is being reproduced and viewed, Steps S22 to S25 which will be subsequently described are repetitively executed. It is to be noted that the content concerned may not be the content transmitted from the content server 21.

In Step S22, the content renderer 31 acquires and branches the content being viewed, and outputs the resulting content to the ACR client 32. In Step S23, the ACR client 32 extracts the signature data from the content being viewed which is inputted from the content renderer 31 with a predetermined sampling period.

In Step S24, every time the signature data is extracted, the ACR client 32 generates the ACR query 60 containing therein the signature data and the user profile data, and sends the ACR query 60 thus generated to the ACR server 23.

In the ACR server 23 which has received the ACR query 60 from the ACR client 32, in Step S13, the ACR response generating portion 44 identifies the content corresponding to the signature data 64 contained in the received ACR query 60 by referring to the ACR database 43.

In Step S14, the ACR response generating portion 44 generates the ACR response 70 in accordance with the result of the identification of the content. At this point, the matching and the filtering of the associated metadata 77 contained in the ACR response 70 are carried out based on the user profile data 66 contained in the ACR query 60. In Step S15, the ACR response generating portion 44 sends the ACR response 70 thus generated to the ACR client 32.

The ACR client 32 which has received the ACR response 70 from the ACR server 23, in Step S25, analyzes the associated metadata 77 contained in the ACR response 70, and causes the application manager 35 to acquire and execute the application which is to be executed in conjunction with the proceeding of the content being viewed.

It is to be noted that, although the associated metadata 77 contained in the received ACR response 70 is previously subjected to the matching and the filtering based on the user profile data in the ACR server 23, the associated metadata 77 contained in the received ACR response 70 may be further subjected to the matching and the filtering based on the user profile data in the ACR client 32.

The application manager 35 acquires the application from the application server 22 and executes the application concerned. The application which has been executed by the application manager 35 acquires the associated metadata 77 from the ACR response 70 which the ACR client 32 holds by using the associated metadata acquisition API.

The processing of Steps S12 to S15, and the processing of Steps S22 to S25 described so far are repetitively executed while the content is being viewed. As a result, the operation of the application, which is executed in conjunction with the processing of the content being viewed and is suitable for the user, becomes possible.

Specifically, for example, in a case where a scene in which a pet is fed exists as certain part of the content, if it becomes clear from the user profile data that the user of the receiving apparatus 30 has a cat, link information such as a commercial banner and a purchase site of pet food for cats can be displayed in the scene concerned by the application which is executed in conjunction with the content concerned.

In addition, for example, in a case where it becomes clear from the user profile data that the language of the user of the receiving apparatus 30 is Spanish, when content such as a program or a CM using a language other than Spanish is being viewed, subtitles of Spanish can be displayed, or a commentary audio of Spanish can be outputted by the application which is executed in conjunction with the content concerned.

In addition, for example, when a viewing area of the user of the receiving apparatus 30 becomes clear from the user profile data, information specialized for the viewing area can be presented to the user by the application which is executed in conjunction with the content concerned.

It is to be noted that, although the concrete example described above can also be carried out by using the existing technique, for actually carrying out the concrete example described above, plural transactions are required between the reception side and the transmission side in order to narrow down information to be presented to the user, and thus it is not possible to quickly present the information which the user requires.

In the case of this embodiment, however, the user profile data 66 is transmitted in a state of being included in the ACR query 60 for requesting the identification of the content. Thus, in the stage of generation of the ACR response 70, the associated metadata 77 can be subjected to the matching and the filtering so as to be suitable for the user of the receiving apparatus 30. Therefore, it is possible to quickly present the information suitable for the user to the user.

Now, each of the transmitting apparatus 20 and the receiving apparatus 30 which execute the series of processing described above not only can be configured in the form of hardware, but also can be realized by running software by a computer. The computer includes a computer incorporated in dedicated hardware, a general purpose personal computer which can execute various kinds of functions by installing therein various kinds of programs, and the like.

Figure 7:
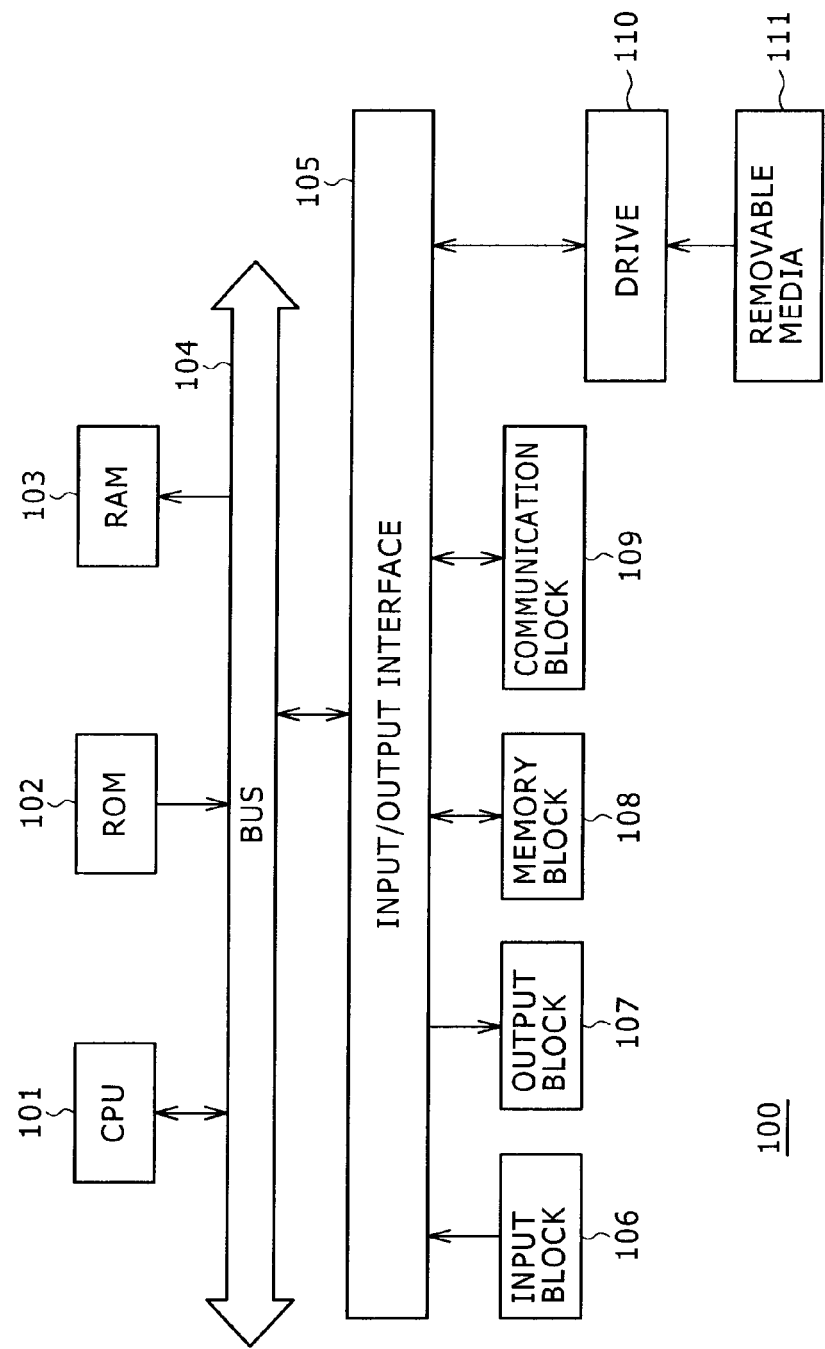
FIG. 7 is a block diagram showing an example of a configuration of a computer.

FIG. 7 is a block diagram showing an example of a configuration of hardware of the computer described above.

In a computer 100, a CPU (Central Processing Unit) 101, a ROM (Read Only Memory) 102, and a RAM (Random Access Memory) 103 are connected to one another through a bus 104.

An input/output interface 105 is further connected to the bus 104. An input block 106, an output block 107, a memory block 108, a communication block 109, and a drive 110 are connected to the input/output interface 105.

The input block 106 includes a keyboard, a mouse, a microphone or the like. The output block 107 includes a display device, a speaker or the like. The memory block 108 includes a hard disk, a non-volatile memory or the like. The communication block 109 includes a network interface or the like. The drive 110 drives a removable media 111 such as a magnetic disk, an optical disk, a magneto-optical disk, or a semiconductor memory.

In the computer 100 configured in the manner as described above, the CPU 101, for example, loads a program stored in the memory block 108 through the input/output interface 105 and the bus 104 into the RAM 103, and runs the program thus loaded, thereby executing the series of processing described above.

The program which the computer 100 (the CPU 101) runs, for example, can be recorded in the removable media 111 serving as a package media or the like to be provided. In addition, the program can be provided through a wired or wireless transmission media such as a local area network, the Internet, or digital satellite broadcasting.

In the computer 100, the program can be installed in the memory block 108 through the input/output interface 105 by mounting the removable media 111 to the drive 110. In addition, the program can be received by the communication block 109 through the wired or wireless transmission media to be installed in the memory block 108. In addition thereto, the program can be previously installed in the ROM 102 or in the memory block 108.

It is to be noted that the program which the computer 100 runs may be a program in accordance with which the processing is executed in a time series manner in the order described in this specification or may be a program in accordance with which the processing is executed in parallel with one another or at a necessary timing such as when a calling is made.

It is to be noted that the embodiment of the present disclosure is by no means limited to the embodiment described above, and thus various changes can be made without departing from the scope of the present disclosure.

What is claimed is:

1. A receiving apparatus comprising:
circuitry configured to:
extract signature data representing a feature of reproduced content from the reproduced content,
generate user profile data,
generate a query containing the signature data and the user profile data,
transmit the query thus generated to a transmitting apparatus,
receive a response that is sent back from the transmitting apparatus in accordance with the query and a matching with the user profile data in the transmitting apparatus, and
acquire and execute an application in conjunction with reproduction of the content based on the response thus received.

2. The receiving apparatus according to claim 1, wherein the circuitry is further configured to generate the user profile data containing a demographic attribute of a user.

3. The receiving apparatus according to claim 2, wherein, every time the signature data is extracted, the circuitry generates the query containing the signature data and the user profile data, transmits the query thus generated to the transmitting apparatus, and receives the response that is sent back from the transmitting apparatus in accordance with the query and the matching with the user profile data in the transmitting apparatus.

4. The receiving apparatus according to claim 2, wherein the circuitry is further configured to generate the user profile data containing at least one of a specification of the receiving apparatus, a congestion situation of a communication network or natural environment information.

5. The receiving apparatus according to claim 2,
wherein the receiving apparatus is built in a reproducing apparatus configured to reproduce content.

6. An information processing method of a receiving apparatus, the method executed by the receiving apparatus, comprising:

extracting signature data representing a feature of reproduced content from the reproduced content;
generating user profile data;
generating a query containing the signature data and the user profile data;
transmitting the query thus generated to a transmitting apparatus;
receiving a response that is sent back from the transmitting apparatus in accordance with the query and a matching with the user profile data in the transmitting apparatus; and
acquiring and executing an application in conjunction with reproduction of the content based on the response thus received.

7. A non-transitory computer readable medium having stored thereon a program that when executed by a computer causes the computer to execute a method comprising:
extracting signature data representing a feature of reproduced content from the reproduced content;
generating user profile data;
generating a query containing the signature data and the user profile data;
transmitting the query thus generated to a transmitting apparatus;
receiving a response that is sent back from the transmitting apparatus in accordance with the query and marching with the user profile data in the transmitting apparatus; and
acquiring and executing an application in conjunction with reproduction of the content based on the response thus received.

8. A transmitting apparatus comprising:
a database showing a correspondence relationship among signature data representing a feature of content extracted from content, a content identifier representing the content of an extraction source, and associated metadata containing an application identifier representing an application for execution in conjunction with the content; and
circuitry configured to
identify the content of the extraction source of the signature data contained in a query transmitted from a receiving apparatus by referring to the database,
generate a response containing the associated metadata including the application identifier representing the application for execution in conjunction with the content thus identified, and
send the response back to the receiving apparatus;
wherein the associated metadata contained in the response is matched with user profile data contained in the query before the response is sent back to the receiving apparatus.

9. The transmitting apparatus according to claim 8, wherein the circuitry is further configured to cause the associated metadata contained in the response before the sending-back to match with a demographic attribute of a user of the receiving apparatus contained in the user profile data.

10. An application interlocking system comprising a transmitting apparatus and a receiving apparatus of content,
wherein the receiving apparatus includes
first circuitry configured to:
extract signature data representing a feature of reproduced content from the reproduced content,
generate user profile data,
generate a query containing the signature data and the user profile data,
transmit the query thus generated to the transmitting apparatus,
receive a response that is sent back from the transmitting apparatus in accordance with the query and a matching with the user profile data in the transmitting apparatus, and
acquire and execute an application in conjunction with reproduction of the content based on the response thus received, and
the transmitting apparatus includes
a database showing a correspondence relationship among the signature data representing the feature of the content extracted from the content, a content identifier representing the content of an extraction source, and associated metadata containing an application identifier representing the application for execution in conjunction with the content,
second circuitry configured to:
identify the content of the extraction source of the signature data contained in the query transmitted from the receiving apparatus by referring to the database,
generate the response containing the associated metadata including the application identifier representing the application for execution in conjunction with the content thus identified, and
send the response back to the receiving apparatus,
wherein the associated metadata contained in the response is matched with user profile data contained in the query before the response is sent back to the receiving apparatus.

\* \* \* \* \*